(12) United States Patent
Gavade et al.

(10) Patent No.: US 9,559,890 B2
(45) Date of Patent: Jan. 31, 2017

(54) ROUTING DEVICE AS A COMMAND CLIENT

(71) Applicant: Verizon Patent and Licensing Inc., Arlington, VA (US)

(72) Inventors: Sameer Gavade, Irving, TX (US); Tariq Roshan, Lewisville, TX (US); Venkata S. Adimatyam, Irving, TX (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 91 days.

(21) Appl. No.: 14/459,400

(22) Filed: Aug. 14, 2014

(65) Prior Publication Data

US 2016/0050144 A1    Feb. 18, 2016

(51) Int. Cl.
*H04L 12/721*    (2013.01)
*H04L 12/24*    (2006.01)
*H04L 12/701*    (2013.01)

(52) U.S. Cl.
CPC ............... *H04L 41/00* (2013.01); *H04L 45/00* (2013.01)

(58) Field of Classification Search
None
See application file for complete search history.

(56) References Cited

U.S. PATENT DOCUMENTS

2012/0243517 A1\* 9/2012 Aguirre ................... H04L 12/66
370/338
2012/0264367 A1\* 10/2012 Aguirre ................ H04W 84/14
455/3.06

\* cited by examiner

*Primary Examiner* — Yemane Mesfin
*Assistant Examiner* — Jeff Banthrongsack

(57) ABSTRACT

A routing device determines data associating commands with devices connected to a local area network (LAN). The routing device receives a request for execution of a particular command and identifies a particular device to execute the particular command based on the command data. The routing device generates an instruction message that causes the particular device to execute the particular command, and the routing device forwards the instruction message to the particular device via the LAN. The request may be received via a wide area network (WAN), and the request may include an address for the routing device on the WAN. When generating the instruction message, the routing device may replace, in the request, the address for the routing device with an address associated with the particular device. The instruction message may further include parameters associated with execution of the particular command by the particular device.

19 Claims, 8 Drawing Sheets

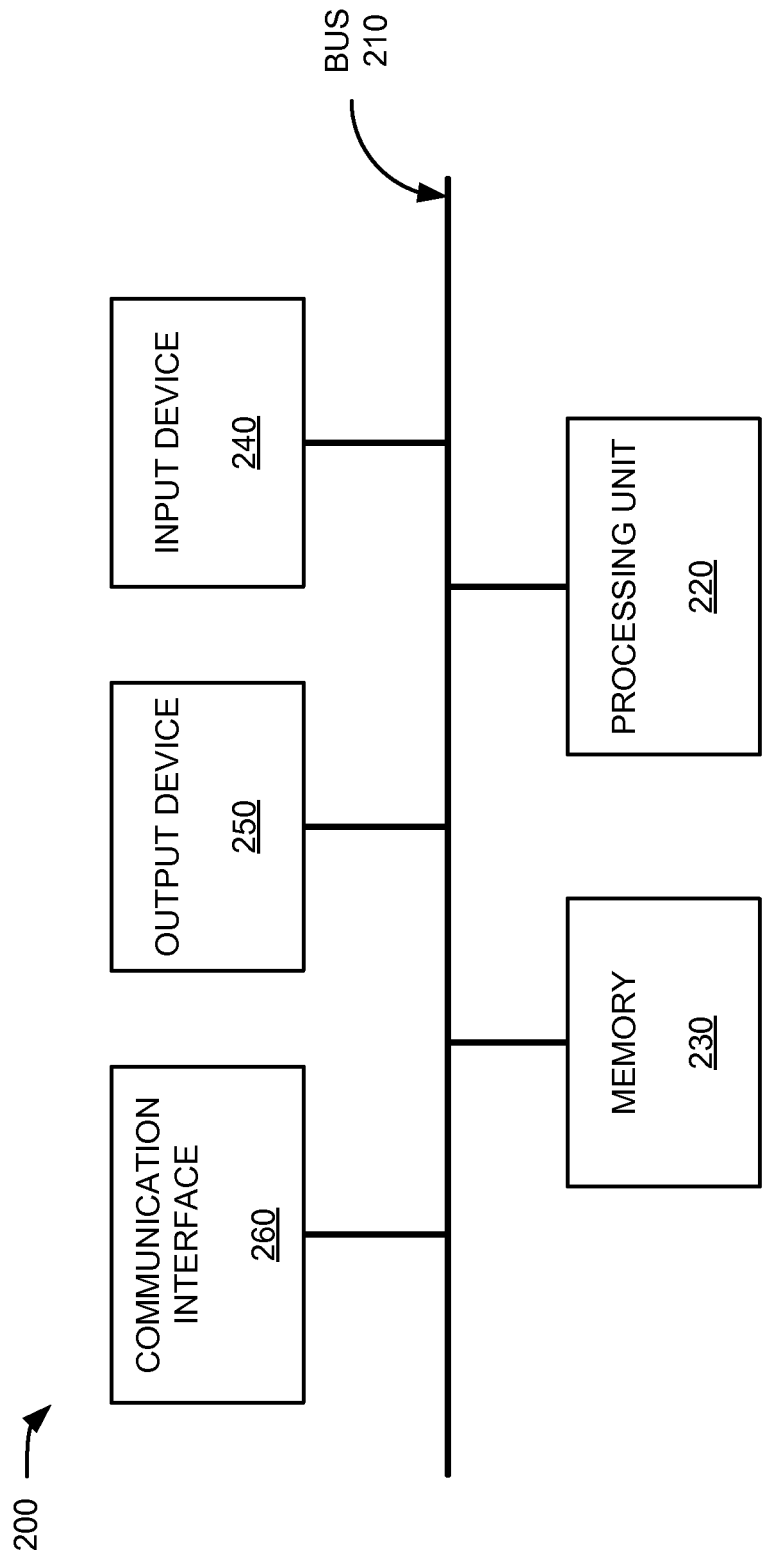

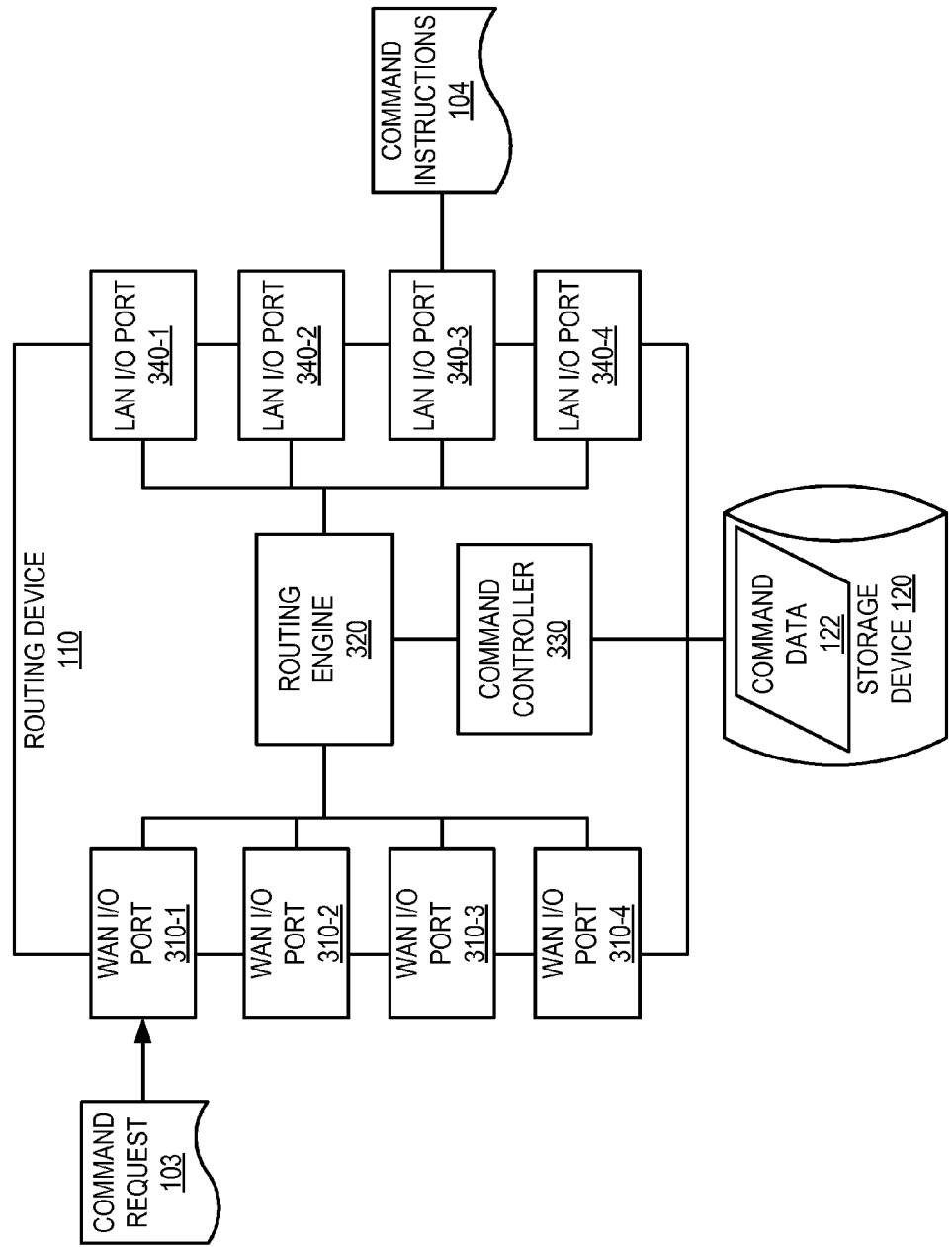

| COMMAND IDENTIFIER 410-1 | PREMISES DEVICE IDENTIFIER 420-1 | COMMAND INSTRUCTION DATA 430-1 |
|---|---|---|
| ... | ... | ... |
| COMMAND IDENTIFIER 410-N | PREMISES DEVICE IDENTIFIER 420-N | COMMAND INSTRUCTION DATA 430-N |

122

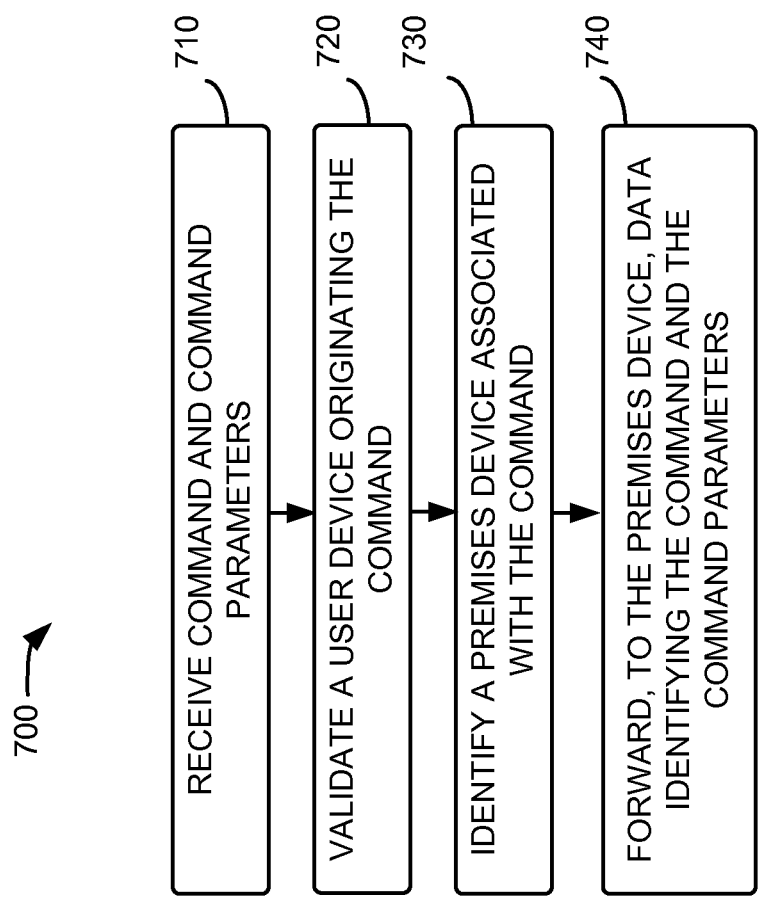

ROUTING DEVICE AS A COMMAND CLIENT

BACKGROUND

In computer networking, a routing table (also known as a routing information base or "RIB") may store data regarding routes or paths between particular network locations, and in some cases, metrics (distances) associated with the routes. For example, a routing table may store route information regarding connection to various other devices. A network node (e.g., a server or a router) may use the routing table to forward data (e.g., a packet) toward a destination identified, for example, in a header of the data. For example, the network node may search an associated routing table to identify a network device representing a "next hop" on a route to the desired final destination. For example, when a router interface is associated with an internet protocol (IP) address and subnet mask identifier, the routing table may store data identifying the IP address, the subnet mask, and an associated interface type.

BRIEF DESCRIPTION OF THE DRAWINGS

FIG. 2 shows a diagram of exemplary components that may be included in one or more devices included in the environments shown in FIGS. 1A and 1B in one implementation described herein;

FIG. 3 shows a diagram of exemplary components that may be included in a routing device included in the environments shown in FIGS. 1A and 1B in one implementation described herein;

FIG. 7 shows a flow diagram of an exemplary process for handling a received command in one implementation described herein.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Implementations described herein may relate to a routing device that may determine data associating commands with other devices connected to a local area network (LAN). The routing device may receive a request for execution of a particular command and may identify a particular device (of the other devices) to execute the particular command based on the command data. The routing device may generate an instruction that causes the particular device to execute the particular command, and the routing device forwards the instruction to the particular device via the LAN. The request may be received via a wide area network (WAN), such as from at application server or from a user device, and the request may include an address for the routing device on the WAN. When generating the instruction, the routing device may replace, in the request, the address for the routing device with an address associated with the particular device. The instruction may further include parameters associated with execution of the particular command by the particular device.

As used herein, the terms "user," "consumer," "subscriber," and/or "customer" may be used interchangeably. Also, the terms "user," "consumer," "subscriber," and/or "customer" are intended to be broadly interpreted to include a user device or a user of a user device. "Digital content," as referred to herein, includes one or more units of digital content that may be provided to a customer.

Figure 1A:
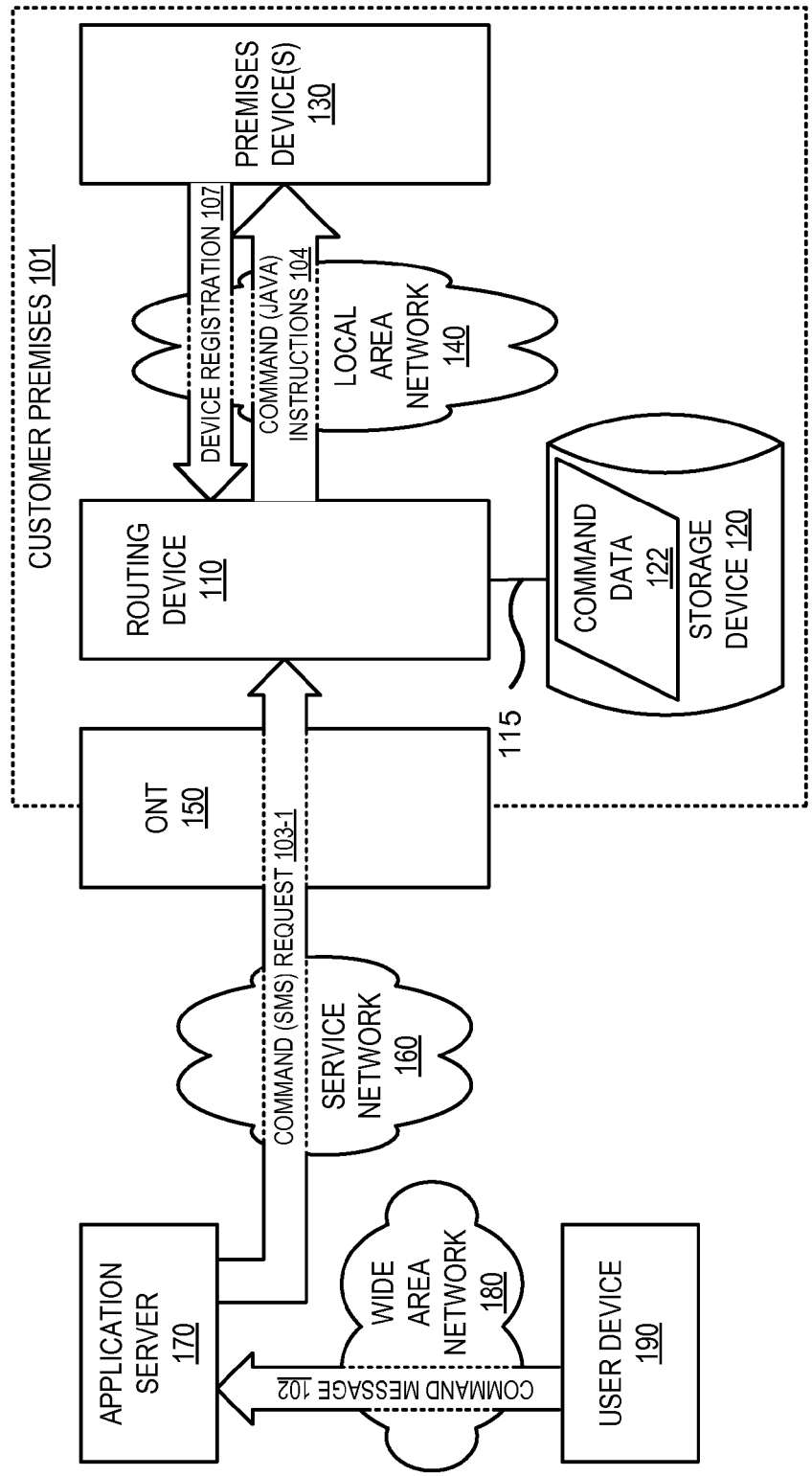
FIGS. 1A and 1B show exemplary environments in which systems and methods described herein may be implemented according to two implementations.
Figure 1B:
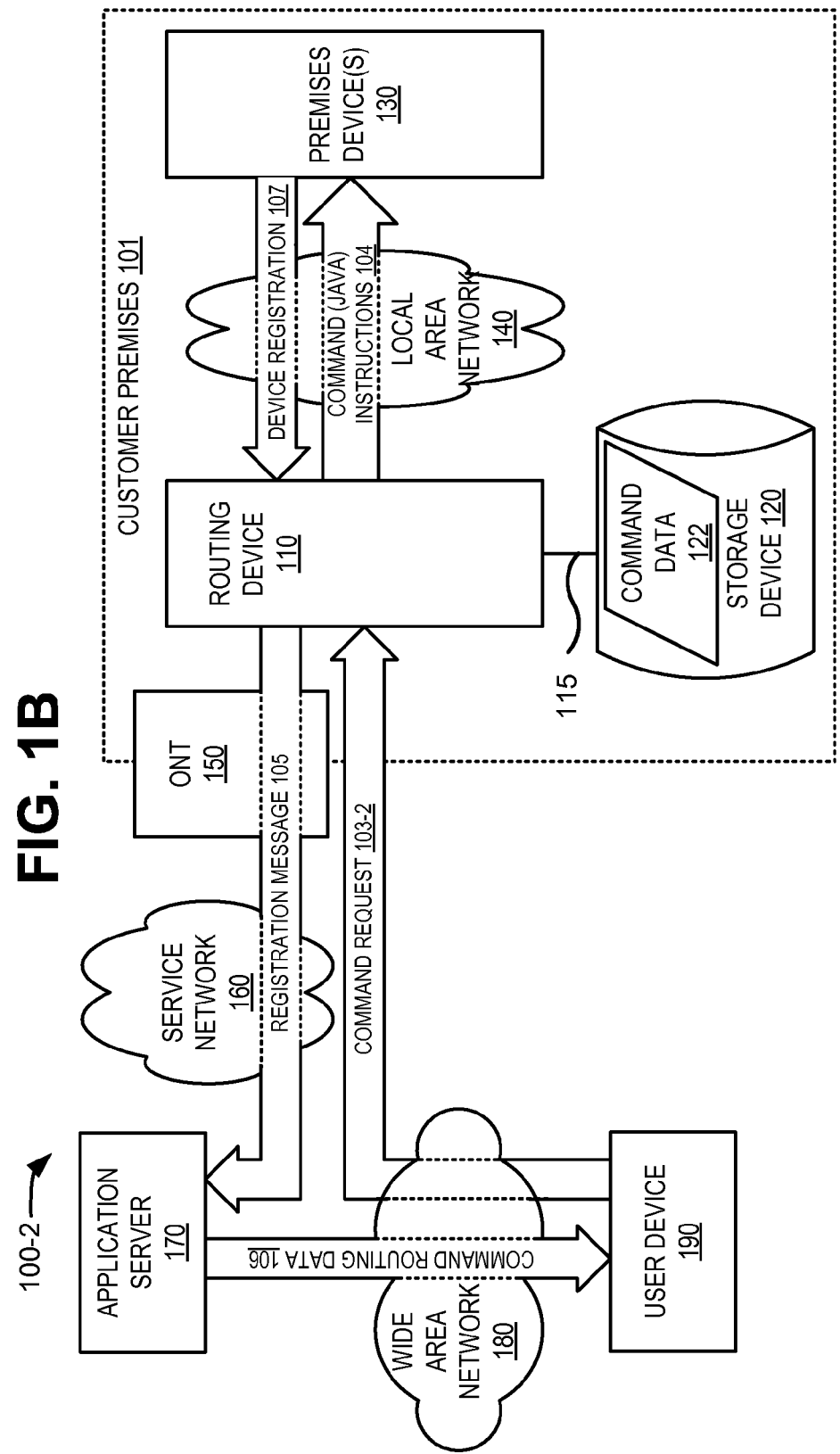

FIGS. 1A and 1B show exemplary environments 100-1 and 100-2, respectively, (collectively and occasionally referred to hereinafter as environment 100) in which systems and methods described herein may be implemented. As illustrated in each of FIGS. 1A and 1B, environment 100 may include customer premises 101, such as a customer's home or office, and customer premises 101 may include a routing device 110, a storage device 120, one or more premises devices 130, a local area network (LAN) 140, and optical network terminal (ONT) 150. It should be appreciated, however, that one or more of routing device 110, storage device 120, premises device 130, or ONT 150 may be positioned remotely from customer premises 101. These various premises, devices, networks and terminals represent commonality between the two environments. The two environments may differ, for example, in where a command request 103 (shown as command request 103-1 in FIG. 1A and as command request 103-2 in FIG. 1B) originate and how the command request 103 is handled, as discussed below.

Continuing with FIG. 1A, a user device 190 may forward a command message 102 identifying a command to be executed by a particular premises device 130 and related information, such as data providing specifics for execution of the command. In the example shown in FIG. 1A, user device 190 may forward command message 102 via a wide area network 180 to an application server 170, and application server 170 may forward a related command request 103-1 to routing device 110 via service network 160 (e.g., via ONT 150). For example, command message 102 in FIG. 1A may include information (e.g., a network address) identifying application server 170, and application server 170 may modify the command message 102 to identify routing device 110. For example, application server 170 may replace, in a destination address field in command message 102, information (e.g., a network address) identifying application server 1170 with information identifying routing device 110.

In one example, command message 102 may be an e-mail message, short messaging system (SMS) message, etc. identifying the command, and application server 170 may identify a routing device 110 and/or premises device 130 associated with the user device 190. For example, application server 170 may identify a customer identifier (e.g., an account number) associated with user device 190 based on parsing command message 102 and/or based on information (e.g., a network address) associated with user device 190, and application server 170 may further identify the particular routing device 110 and/or premises device 130 associated with user device 190 based on the customer identifier.

In the example shown in FIG. 1B, user device 190 may generate and forward command request 103-2 to routing device 110. Please note that command requests 103-1 and 103-2 may, in certain circumstances, be substantively similar in content, but are labeled differently herein merely because they may originate and therefore, by handled differently in respective environments 100-1 and 100-2). Application server 170 may receive information registration message 105 carrying, for example, information (e.g., a network address) identifying routing device 110 and/or a particular premises device 130 associated with a command, and application server 170 may forward, to user device 190, command routing data 106 identifying routing device 110 and/or premises device 130.

Continuing with environment 100 shown in FIGS. 1A and 1B, routing device 110 may generate command instructions 104 by replacing, in command request 103 (e.g., in a destination address field), routing information (e.g., a port on routing device 110, an address on LAN 140, etc.) identifying routing device 110 with alternative information identifying a particular premises device 130 associated with the command. In generating command instructions 104, routing device 110 may further add additional information related to execution of the command by the particular premises device 130.

In environment 100, routing device 110, also referred to as a broadband home router (BHR) or residential gateway, may act as a hub for communications between customer premises 101 and service provider via a service network 160. For example, application server 170 and premises devices 130 (or other components in customer premises 101) may communicate via routing device 110. Routing device 110 may also enable communications between components within customer premises 101, such as forwarding command instructions 104 to premises device 130.

As described herein, routing device 110 may access storage device 120 that stores command data 122. Command data 122 may store, for example, information identifying premises device 130 associated with various commands. Routing device 110 may receive, from user device 190 and/or application server 170, content command request 103 identifying a particular command to be performed on behalf of user device 190, and routing device 110 may identify (e.g., based on command data 122) a particular premises device 130 to perform the command and may forward command instructions 104 to the particular premises device 130. Command instructions 104 may further include other metadata associated with the command, such as information enabling the particular premises device to execute the command, authenticate the instruction, respond to the instructions, etc.

Routing device 110 may determine command data 122 based on information received from premises device 130. For example, a premises device 130 may forward, to the routing device 110, device registration carrying information identifying functions (i.e., commands) that can be executed by premises device 130 and additional data that may be used by premises device 130 when executing the commands. In addition or alternatively, routing device 110 may store command data 122 based on handling of previously received command requests 103, such as to update command data 122 to reflect commands successfully handled by an associated premises device 130. In one implementation shown in FIG. 1B, routing device 110 may forward, to application server 170, information (e.g., registration message 105) identifying functions and/or commands that may be executed via routing device 110 (e.g., by one or more premises devices 130 linked to routing device 110 via LAN 140).

Storage device 120 may store data persistently and may include, for example, a data storage device using integrated circuit assemblies as memory (e.g., a state-state drive (SSD)), a magnetic recording medium (e.g., a tape drive or a hard disk drive (HDD)) and/or an optical recording medium (e.g., a digital video disk (DVD) or compact disc (CD)).

As described herein, storage device 120 may be coupled to routing device 110 by a data connection 115. The data connection 115 may include, for example, a wired connection, such as a universal serial bus (USB) connection (not shown), a wireless connection (not shown) using a short-range wireless communication standard such as WiFi or Bluetooth, or via a network, such as LAN 140. In another example, storage device 120 may be included as a component of routing device 110 or may be connected to routing device 110 by an internal bus or other type of connection.

Premises devices 130 may include any device (e.g., an Internet Protocol (IP)-based device) that is capable of communicating via a routing device 110 to obtain command instructions 104. For example, premises device 130 may include a set-top box (STB) or other device at customer premises 101 to receive digital content, such as television programming. VOD content, etc.; record the content (e.g., via a digital video recorder or DVR); and provide the content to televisions or other output devices (not shown). For example, command instructions 104 may relate to accessing and/or recording particular digital contents at a particular time. In one implementation, features of premises device 130 may be incorporated directly within televisions or other output devices.

In another implementation, premises devices 130 may correspond to a device located at customer premises 101 and that performs commands that are unrelated to handling digital content (e.g., premises device 130 differs from an STB). For example, premises devices 130 may perform commands related to controlling environmental conditions within customer premises 101, such as commands for managing temperature, lighting, etc. In another example, premises devices 130 may perform commands related to controlling access to customer premises, such as entry locks, security devices, etc.

In yet another implementation, premises devices 130 include a laptop computer, a tablet computer, a notebook computer, a personal computer (PC), an ultra mobile personal computer (UMPC), a netbook, a game-playing device/console, or other types of computation or communication devices, threads or processes running on these devices, and/or objects executable by these devices. Premises devices 130 may also include a communication device, such as a voice over Internet protocol (VoIP) telephone (e.g., a session initiation protocol (SIP) telephone), a personal digital assistant (PDA) that can include a radio, a mobile telephone (e.g., a cell phone), a smart phone (e.g., that may combine a cellular radio with data processing and data communications capabilities), etc.

As shown in FIGS. 1A and 1B, premises devices 130 may interact with routing device 110 and storage device 120 via LAN 140 (e.g., a home wired or wireless network). In another implementation (not shown in FIGS. 1A or 1B), a premises device 130 may be located remotely from customer premises 101 and may connect to customer premises 101 and routing device 110 via wired, wireless, or optical connections included in a network, such as service network 160.

LAN 140 may include wired connection, such as a multimedia over coax (MoCA) connection between routing device 110 and premises devices 130. Alternatively, LAN 140 may connect routing device 110 to one or more premises device 130 via short-range wireless connections (e.g., WiFi®, Bluetooth®, etc.). When LAN 140 includes Bluetooth®, premises devices 130 may forward a friendly identifier to routing device 110 identifying commands and/or functions that can be handled by premises device 130.

Services network 160 and/or WAN 180 may include one or more wired, wireless and/or optical networks that are capable of receiving and transmitting data, voice and/or video signals, including multi-media signals that include voice, data and video information. For example, services network 160 and/or WAN 180 may include one or more public switched telephone networks (PSTNs) or other type of switched network. Service network 160 may also include one or more wireless networks and may include a number of transmission towers for receiving wireless signals and forwarding the wireless signals toward the intended destinations. Service network 160 may further include one or more satellite networks, one or more packet switched networks, such as an Internet protocol (IP) based network, a LAN, a WAN, a personal area network (PAN) (e.g., a wireless PAN), an intranet, the Internet, or another type of network that is capable of transmitting data.

In one implementation, service network 160 may include an optical network, and routing device 110 may receive communications from application server 170 via ONT 150 that converts optical signals from service network 160 to electrical signals and, in the reverse direction, converts electrical signals from routing device 110 to optical signals for transmission to application server 170 via service network 160.

In environment 100, application server 170 may determine an identifier (e.g., a network address) associated with routing device 110, and application server 170 may further determine commands accepted via routing device 110. For example, application server 170 may parse a communication received from routing device 110 (e.g., registration message 105 shown in FIG. 1B) to determine the commands accepted by routing device 110. In the example shown in FIG. 1A, application server 170 may use the information regarding routing device 110 to modify command message 102 and forward a resulting command request 103-1 to routing device 110. Interactions between routing device 110 and application server 170 may be performed, for example, using hypertext transfer protocol (HTTP) or secure HTTP (HTTPS) via service network 160.

In the example shown in FIG. 1B, application server 170 may provide user device 190 with command routing information data 106 regarding routing device 110, and user device 190 may use this information to forward command request 103-2 to routing device 110 without passing the message through application server 170.

Application server 170 may further provide an interface to receive and transmit messages and data with respect to user device 190. For example, application server 170 may provide an interface, such as a graphical user interface (or GUI) or a web page, to receive an input from user device 190 related to command message 102 in FIG. 1A and/or to transmit command routing data 106 to user device 190 in FIG. 1B.

In one implementation, application server 170 may further authenticate user device 190 to determine that user device 190 is authorized to forward command message 102 (as shown in FIG. 1A) and/or to receive information identifying commands accepted by routing device 110. For example, application server 170 may determine whether user device 190 is associated with a customer identifier (e.g., an account number) associated with routing device 110. For example, application server 170 may receive a login request associated with a user and may initiate a login process. Additionally or alternatively, application server 170 may request/receive device information (e.g., a registration token) associated with user device 190 and may compare the device information with stored information to validate/authenticate user device 190.

In one implementation application server 170 may generate command request 103-1 (FIG. 1A) in connection with another activity (e.g., without receiving command message 102 from user device 190). For example, if application server 170 is providing digital content to routing device 110, application server 170 may request execution of a command related to processing, storing, decoding, presenting, etc. the command digital content by one of the premises devices 13 and/or execution of another command relate to modifying environmental conditions (e.g., dimming lights) by one of the premises devices 130 during playback of the digital contents.

User device 190 may include an STB or other related device located outside of customer premises 101 (e.g., at another customer premises not shown in FIGS. 1A and 1B). In another implementation, user device 190 may include a laptop computer, a tablet computer, a notebook computer, a personal computer (PC), an ultra mobile personal computer (UMPC), a netbook, a game-playing device/console, or other types of computation or communication devices, threads or processes running on these devices, and/or objects executable by these devices. User devices 190 may also include a communication device, such as a VoIP telephone (e.g., a SIP telephone), a PDA that can include a radio, a mobile telephone (e.g., a cell phone), a smart phone (e.g., that may combine a cellular radio with data processing and data communications capabilities), etc.

The exemplary configurations illustrated in FIGS. 1A and 1B are provided for simplicity. It should be understood that a typical network may include more or fewer devices than those illustrated in FIGS. 1A and 1B. For example, application server 170 may be connected via service network 160 to numerous customer premises 101. Environment 100 may also include additional elements, such as switches, gateways, routing devices, backend systems, etc., that aid in routing information between customer premises 101 and application server 170 and/or user device 190. Also, in some instances, one or more of the components of environment 100 may perform one or more functions described as being performed by another one or more of the components of environment 100.

FIG. 2 is a diagram illustrating exemplary components of a device 200. Device 200 may correspond, for example, to routing device 110; premises device 130; application server 170; user device 190; or a component (e.g., an intermediate node) of LAN 140, service network 160, and/or WAN 180 and may be implemented/installed as a combination of hardware and software on one or more devices 200. As shown in FIG. 2, device 200 may include, for example, a bus 210, a processing unit 220, a memory 230, one or more input devices 240, one or more output devices 250, and a communication interface 260.

Bus 210 may permit communication among the components of device 200. Processing unit 220 may include one or more processors or microprocessors that interpret and execute instructions. In other implementations, processing unit 220 may be implemented as, or include, one or more application specific integrated circuits (ASICs), field programmable gate arrays (FPGAs), or the like.

Memory 230 may include a random access memory (RAM) or another type of dynamic storage device that stores information and instructions for execution by processing unit 220, a read only memory (ROM) or another type of static storage device that stores static information and instructions for the processing unit 220, and/or some other type of magnetic or optical recording medium and its corresponding drive for storing information and/or instructions.

Input device 240 may include a device that permits a user to input information to device 200, such as a keyboard, a keypad, a mouse, a pen, a microphone, one or more biometric mechanisms, and the like. Output device 250 may include a device that outputs information to the user, such as a display, a speaker, etc.

Communication interface 260 may include any transceiver-like mechanism that enables device 200 to communicate with other devices and/or systems. For example, communication interface 260 may include mechanisms for communicating with other devices, such as other devices of network environment 100. In one implementation, communications interface 260 may support short range wireless network communications (e.g., via Bluetooth protocols). In another implementation, communications interface 260 may support long range wireless network communications (e.g., cellular network services). In other implementations, communication interface 260 may support other wired or wireless network communications.

As described herein, device 200 may perform certain operations in response to processing unit 220 executing software instructions stored in a computer-readable medium, such as memory 230. A computer-readable medium may include a non-transitory tangible memory device. A memory device may be implemented within a single physical memory device or spread across multiple physical memory devices. The software instructions may be read into memory 230 from another computer-readable medium or read into memory 230 from another device via communication interface 260. The software instructions stored in memory 230 may cause processing unit 220 to perform processes described herein. Alternatively, hardwired circuitry may be used in place of or in combination with, software instructions to implement processes described herein. Thus, implementations described herein are not limited to any specific combination of hardware circuitry and software.

Although FIG. 2 shows exemplary components of device 200, in other implementations, device 200 may include fewer components, different components, differently-arranged components, or additional components than those depicted in FIG. 2. As an example, in some implementations, a display may not be included in device 200. In these situations, device 200 may be a "headless" device that does not include input device 240. Alternatively, or additionally, one or more components of device 200 may perform one or more other tasks described as being performed by one or more other components of device 200.

FIG. 3 is a diagram illustrating exemplary components of routing device 110. As shown in FIG. 3, routing device 110 may include, for example, wide area network (WAN) input/output (I/O) ports 310-1 through 310-4 (herein referred to individually as WAN I/O port 310 and collectively as WAN I/O ports 310), router engine 320, command con roller 330, and local area network (LAN) I/O ports 340-1 through 340-4 (herein referred to individually as LAN I/O port 340 and collectively as LAN I/O ports 340).

As described herein, WAN I/O ports 310 may exchange data via network 160 (e.g., through ONT 150) and/or via WAN 180, and LAN I/O ports 340 may exchange data between routing device 110 and premises devices 130 via LAN 140. WAN I/O ports 310 and LAN I/O ports 340 may include, for example, a physical connector (not shown) that receives and accepts a wire, cable, or other data pathway for carrying data and/or a wireless interface for receiving the data. WAN I/O ports 310 and LAN I/O ports 340 may also include a buffer (not shown) for storing received data for processing and transmission. While FIG. 3 shows that routing device 110 includes four (4) WAN I/O ports 310 and four (4) LAN I/O ports 340, it should be appreciated that FIG. 3 is merely an example of routing device 110 and routing device 110 may include any reasonable number of WAN I/O ports 310 and LAN I/O ports 340.

Routing engine 320 may include, for example, a processor (such as processing unit 220) and/or software application to control the exchange of data on a switch fabric (also referred to as a crosspoint or a crosspoint switch) between WAN I/O ports 310 and LAN I/O ports 340. For example, routing engine 320 may direct a command received at WAN I/O port 310 to an appropriate LAN I/O port 340 for transmission to a premises device 130 for handling the command. Routing engine 320 may further direct data received from one premises device 130 at LAN I/O port 340 to WAN I/O port 310 for transmission to application server 170 and/or user device 190.

Command controller 330 may form and maintain command data 122 that identifies associated premises device 130 for various commands. Command controller 330 may update command data 122 to include, for example, (1) data identifying a command; (2) data identifying a premises device 130 to execute the command; and (3) data to be used by the premises device 130 during execution of the command. Command controller 330 may populate command data 122 based on messages received from premises device 130 identifying commands handled by the premises device 130. For example, a premises device 130 may provide, to command controller 330, information identifying commands handled by the premises device 130. In addition or alternatively, premises devices may identify performed functions, and command controller 330 may determine commands to associate with the functions. For example, command controller 330 may associate commands for obtaining and/or presenting digital content with a first premises device 130 corresponding to an STB, and may associate commands for handling communications with a second premises device 130 corresponding to a communications device. Similarly, command controller 330 may associate commands for handling and/or storing data with a third premises device 130 corresponding to a computing device.

As shown in FIG. 3, routing device 110 may receive command request 103 via one or more WAN I/O ports 310 (shown as WAN I/O port 310 in FIG. 3), and routing engine 320 may direct command request 103 to command controller 330 for handling. Command controller 330 may parse command request 103 to identify an associated command, and may further access command data 122 to identify a particular premises device 130 and/or other metadata associated with the identified command.

Command controller 330 may then use the identified portion of command data 122 to modify the command request 103 to generate command instructions 104 that are directed to the particular premises device 130 for handling the command. For example, command request 103 may be addressed to an IP address and/or a port (e.g., one of WAN I/O ports 310) associated with routing device 110, and command controller 330 may form command instructions 104 by replacing, in command request 103, the address for routing device 110 with an address for the particular premises device 130 that handles the command. Command controller 330 may also include, in command instructions 104, data related to executing the command. Command controller 330 may further forward command instructions 104 to the particular premises device 130 (not shown in FIG. 3) via a particular LAN I/O port 340 (shown in FIG. 3 as I/O port 340-3).

Although FIG. 3 shows that routing device 110 receives command request 103 via WAN I/O ports 310 (e.g., corn d request 103-1 received from application server 170 and/or command request 103-2 received from user device 190), routing device 110 may also or alternatively receive an alternative command request from another component. For example, routing device 110 may receive the alternative command request via a LAN I/O port 340 (e.g., from another premises device 130), and may direct the alternative com und request to command controller 330 for processing, such identifying a corresponding command and forwarding related information regarding the corresponding command to another premises device 130. In another example, routing device 110 may further generate a command request internally, such as to provide a service, perform maintenance, etc. For example, routing device 110 may instruct premises device 130 to deactivate during maintenance.

Continuing with FIG. 3, command controller 330 may further collect and store metadata regarding command request 103 and/or command instructions 104. For example, command controller 330 may determine when a command is received, identify a particular premises device 130 assigned to the command, and determine a status of the execution of the command. In one implementation, command controller 330 may perform additional functions related to the execution status of the command, such as (1) retransmit command instruction 104 or (2) forward the command to a different premises device 130 if the particular premises device 130 does not perform the command within a threshold amount of time after initial transmission of command instruction 104.

Although FIG. 3 shows exemplary components within routing device 110, in other implementations, routing device 110 may include fewer components, different components, differently-arranged components, or additional components than those depicted in FIG. 3. As an example, in some implementations, routing device 110 may include a scheduling component to schedule delivery of command instruction 104 to a premises device 130 when there is adequate available bandwidth (e.g., no congestion) on LAN 140. For example, delivery of command instruction 104 may be scheduled at night, when bandwidth used by premises devices 130 is generally lower. Alternatively, or additionally, one or more components of routing device 110 may perform one or more other tasks described as being performed by one or more other components of device 110. For example, command controller 330 may be included in storage device 120.

Figure 4:
FIG. 4 shows exemplary information that may be included in command data for processing commands in the environments shown in FIGS. 1A and 1B in one implementation described herein.

FIG. 4 shows exemplary information that may be included in command data 122 in one implementation. As shown in FIG. 4, command data 122 may include, for example, command identifiers 410 (shown in FIG. 4 as command identifiers 410-1 through 410-N), premises device identifiers 420 (shown in FIG. 4 as premises device identifiers 420-1 through 420-N), and command instruction data 430 (shown in FIG. 4 as command data 4301 through 430-N).

Command identifiers 410 may include information identifying a command. For example, a command identifier 410 may include a text string identifying a command. For example, command identifier 410 may include a descriptor summarizing a function or other information associated with execution of the command. In command data 122, a row may correspond to information associated with a particular command identifier 410. For example, premises device identifier 420 may include information identifying a particular premises device 130 to execute the particular command, and command instruction data 430 may include information related to execution of the particular command by the particular premises device 130.

Device identifier 420 may include data identifying a premises device 130, such as a network address that may be used to route command instructions 104 from routing device 110 to a corresponding premises device 130 via LAN 140. For example, device identifier 420 may include a mobile equipment identifier (MEID), a network address on LAN 140, a telephone number, an IP address, a device serial number, etc. Device identifier 420 may further include routing information, such as data identifying a particular LAN I/O port 340 or an intermediate device (e.g., a hop) associated with a path between routing device 110 and the particular premises device 130.

Command instruction data 430 may include information related to execution of a command by a premises device 130. For example, command instruction data 430 may include data used by premises device 130 to populate fields associated with a command. For example, command instruction data 430 may specify specifics of executing the commands, such as to specify how long, how often and/or in what manner to execute a command. For example, the command may correspond to an instruction to perform an action using particular hardware and/or software, and command instruction data 430 may identify the particular hardware and/or software.

Although FIG. 4 shows exemplary data that may be included in command data 122, in other implementations, command data 122 may include fewer data, different data, differently-arranged data, or additional data than those depicted in FIG. 4. Alternatively, or additionally, one or more data type included in command data 122 may include information described as being included in one or more other data types included in command data 122.

Figure 5:
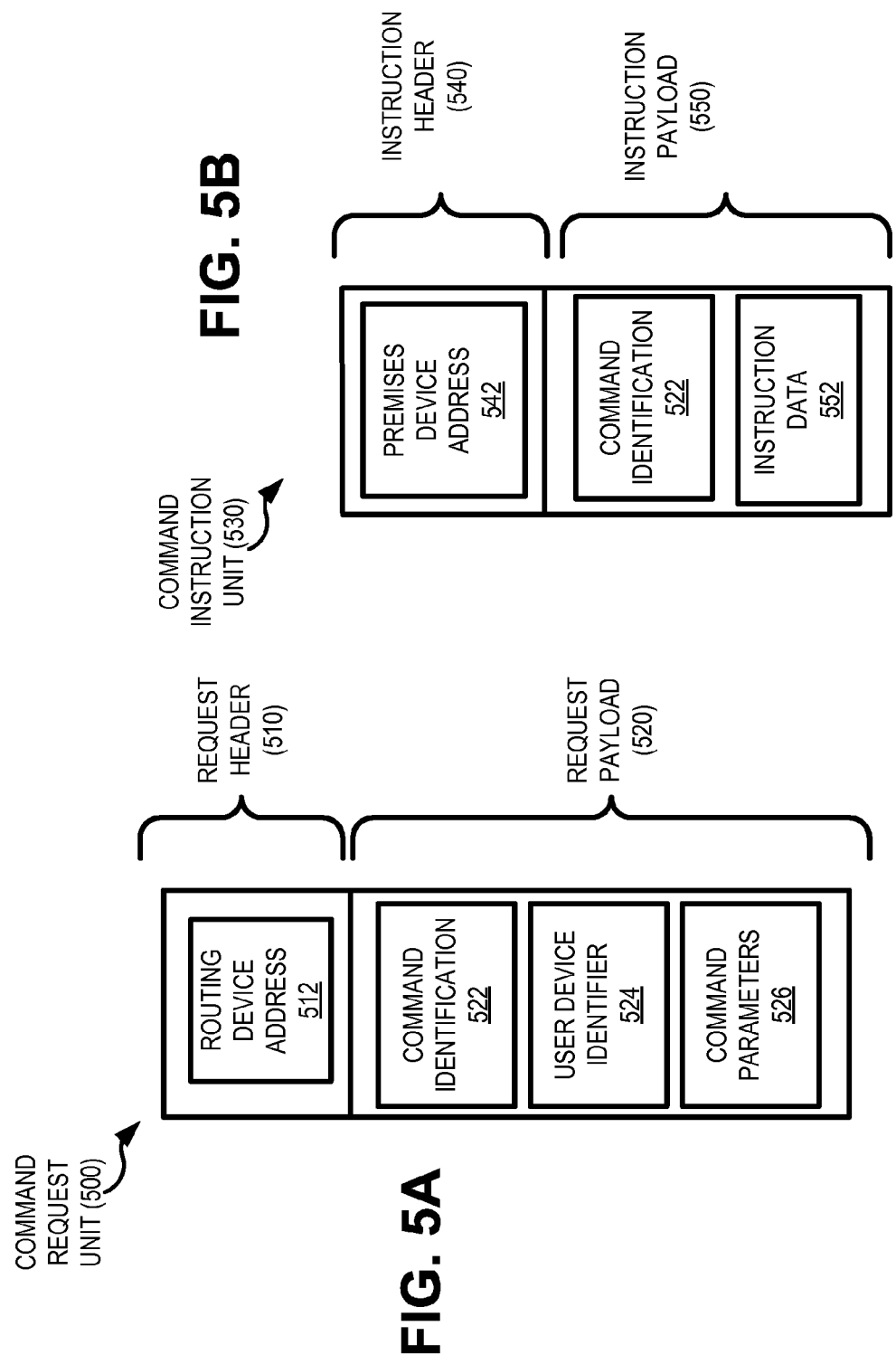
FIG. 5A shows data included in an exemplary command request unit that may be transmitted within the environments shown in FIGS. 1A and 1B in one implementation described herein.
FIG. 5B shows data included in an exemplary command instruction unit that may be transmitted within the environments shown in FIGS. 1A and 1B in one implementation described herein.

FIG. 5A shows an exemplary command request unit 500 (e.g., a packet) included in command request 103 (i.e., 103-1 or 103-2) in one implementation. In one implementation, command request unit 500 may be sent from application server 170 and/or user device 190 to routing device 110. For example, command request unit 500 may include a request header 510 and a request payload 520. Request header 510 may store, among other things, a routing device identification 512 that enables the command request unit 500 to be sent to routing device 110 (e.g., via services network 160 and/or WAN 180). Routing device identification 512 may include an IP address or other identifier (e.g., a telephone number, a MEID, serial number, etc.) associated with routing device 110.

Request payload 520 may store, for example, command identification 522 identifying a command to be performed, and/or other data associated with a requested command, such as user device identifier 524 identifying a user device 190 that originated the command and command parameters 526 identifying parameters for executing the command by the user device 190. Command identification 522 may include, for example, a text string identifying and/or describing a desired command. In another example, command identification 522 may correspond to a numerical code that may be used by routing device 110 to identify an appropriate command, User device identifier 524 may include an IP address or other identifier (e.g., a telephone number, a MEID, serial number, etc.) associated with user device 190 requesting execution of the command. User device identifier 524 may further include information identifying an account number and/or a user associated with user device 190. Command parameters 526 may include metadata identifying how premises device 130 should perform the command, such as identifying a time for execution of the command, data to be used by premises device 130 when executing the command, and/or a user device 190 to receive results from executing the command.

Although shown is a part of request payload 520, it should be appreciated that command identification 522, user device identifier 524, and/or command parameters 526 may also be included as a field in request header 510. For example, if command request unit 500 is received from user device 190 (e.g., in connection with command request 103-2 as shown in FIG. 1B), request header 510 may include user device identifier 524 in a "from" field in request header 510.

FIG. 5B shows an exemplary command instruction unit 530 (e.g., a packet) included in command instruction 104. For example, command instruction unit 530 may include an instruction header 540 and an instruction payload 550. Instruction header 540 may store, among other things, a premise device address 542 that enables the command instruction unit 530 to be routed from routing device 110 to a particular premise device 130 associated with the command. Premise device address 542 may correspond, for example, to a portion of premises device identifier 420 associated with the command. Instruction payload 550 may store, for example, command identification 522 (corresponding to command identifier 410) and/or other data associated with a requested command being assigned to the corresponding premises device 130 by routing device 110. Instruction payload 550 may further store, for example, instruction data 552 (corresponding to command instruction data 430 and/or command parameters 526) for executing of the requested command by the specified premises device 130.

In operation, command controller 330 may replace, in command request unit 500, routing device address 512 with premises device address 542 and may add instruction data 552 to the instruction payload 550 to generate command instruction data 530.

Although FIGS. 5A and 5B show exemplary data that may be included in command request unit 500 and in command instruction unit 530, in other implementations, command request unit 500 and command instruction unit 530 may include fewer data, different data, differently-arranged data, or additional data than those depicted in FIGS. 5A and 5B. Alternatively or additionally, one or more data types included in command request unit 500 and/or command instruction unit 530 may include information described as being included in other data type included in command request unit 500 and in command instruction 530.

Figure 6:
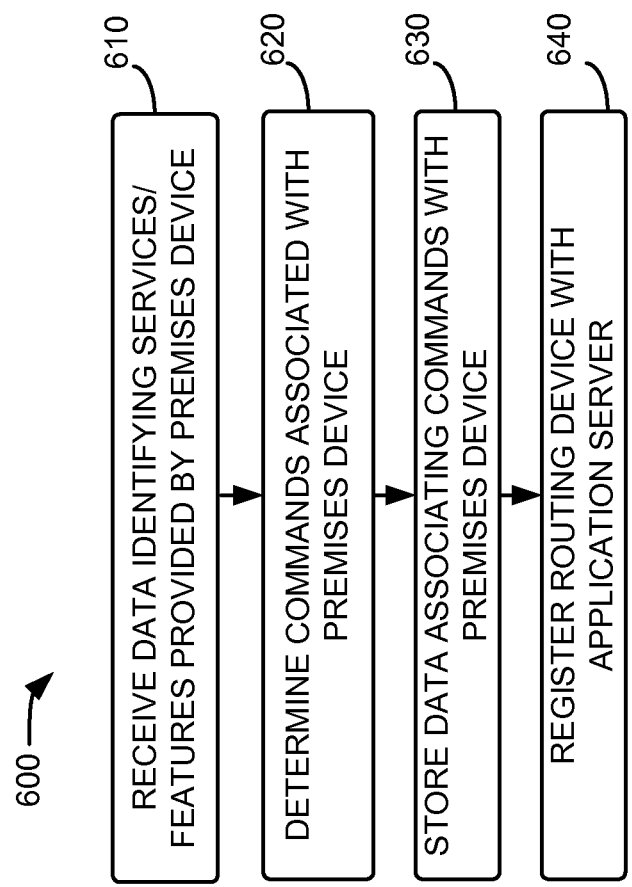
FIG. 6 is a flow diagram illustrating an exemplary process for acquiring and storing command data in order to associate commands with premises devices in one implementation described herein.

FIG. 6 is a flow diagram illustrating an exemplary process 600 for acquiring and storing command data 122 to associate commands with premises devices 130. In one implementation, process 600 may be performed by routing device 110. In other implementations, process 600 may be performed by one or more other devices of environment 100, such as storage device 120, premises device 130, application server 170, and/or user device 190.

As shown in FIG. 6, process 600 may include receiving data identifying services/features provided by a premises device 130 (block 610) and determining commands associated with the premises device 130 (block 620). For example, routing device 110 may receive and parse communications from premises device 130 to determine a function performed by premises device 130, and may determine one or more commands associated with the function. In one implementation, a premises device 130 may forward a communication to routing device 110 (e.g., via LAN 140) identifying commands accepted by the premises device 130. In another implementation, a premises device 130 (e.g., an STB) may collect information identifying commands handled by other premises devices 130 and may report this information to routing device 110.

Continuing with FIG. 6, process 600 may further including storing data associating commands and corresponding premises devices 130 (block 630) and registering routing device with application server (block 640). For example, routing device 110 may forward data to storage device 120 (e.g., via data connection 115) to update and/or generate command data 122 to include command identifiers 410 and premises device identifiers 420, and may further structure command data 122 to logically associate command identifiers 410 and premises device identifiers 420. In one implementation, routing device 110 may further forward data (e.g., registration message 105 in FIG. 1B) to application server 1170 summarizing or including a portion of command data 122. For example, routing device 110 may send data identifying commands (e.g., command identifiers 410) that are accepted and handled by premises devices 130 connected to routing device 110.

FIG. 7 shows a flow diagram illustrating an exemplary process 700 for handling a received command. In one implementation, process 700 may be performed by routing device 110. In other implementations, process 700 may be performed by one or more other devices of environment 100, such as storage device 120, premises device 130, application server 170, and/or user device 190.

As shown in FIG. 7, process 700 may include receive command and command parameters (block 710) and validate the user device 190 originating the command (block 720). For example, routing device 110 may receive command request 103 from application server 170 (see, for example, FIG. 1A) or from ser device 190 (see, for example, FIG. 1B). As described above with respect to FIG. 5A, command request unit 500 may include information identifying a command (e.g., command identification 522), information identifying user device 190 originating the command (e.g., user device identifier 524), and/or information identifying parameters for executing the command (e.g., command parameters 526). Routing device 110 may parse command request unit 500 to extract command identification 522, user device identifier 524, and/or command parameters 526. Routing device 110 may identify a user and/or account number associated with the identified user device 190 (e.g., based on user device identifier 524) and may determine whether the user is authorized to request the identified command.

Continuing with FIG. 7, process 700 may further include identifying a premises device 130 associated with the command (block 730) and forwarding, to the identified premises device 130, data identifying the command and the command parameters (block 740). For example, routing device 110 may access command data 122 to determine a premises device 130 associated with the command. For example, routing device 110 may determine a command identifier 410 associated with command identification 512, and may access command data 122 to acquire premises device identifier 420 and/or command instruction data 430 associated with the command identifier 410. Routing device 110 may generate command instruction unit 530 that includes premise device address 542 that is associated with premises device identifier 420. Command instruction unit 530 may include instruction data 552 elated to execution of the command by the premises device 130, and instruction data 552 may be populated based on, for example, command parameters 526 and/or command instruction data 430. Routing device 110 may forward command instruction unit 530 to the associated premises device 130 based on premises device address 542. For example command instruction unit 530 may be routed by routing engine 320 to an appropriate LAN I/O port 340 for transmission to the associated premises device 130.

Implementations of the systems and methods are now discussed with respect to several examples. In one example, a user may use a user device 190, such as a smart phone, to forward a command to turn on a light at the user's home. Application server 170 may determine a customer premises 101 associated with the user (e.g., the user's home), and application server 170 may forward information to a routing device 110 associated with the customer premises 101 to request turning on the light. Routing device 110 may identify a premises device 130 (e.g., a light controller) associated with the command for turning on the particular light and may forward an instruction message (e.g., command instruction 104) to the light controller to turn on the light. In certain implementations, the command instructions from routing device 110 may include parameters to cause future or repeated actions, such as to request that the light be turned on at a later time or to be turned on during evenings. In another example, the command instructions from routing device 110 may include more complicated sets of instructions, such causing the light controller to determine sunrise and sunset times (e.g., by interfacing with an optical sensor and/or by collecting information from another source) and to turn on the lights between the sunset and the sunrise times.

In another example, user device 190 may forward a command related to ordering/managing digital content, such as recording a program using a digital video recorder (DVR). Application server 170 may determine a customer premises 101 associated with the user (e.g., the user's home), and application server 170 may forward information to a routing device 110 associated with the customer premises 101 to request recording of the program. In this example, routing device 110 may determine that commands associated with the DVR are executed by a premises device 130 corresponding to a STB, and routing device 110 may forward instructions to the STB to cause the program to be recorded. The instructions provided by the routing device 110 to the STB may include parameters identifying, for example, a time, a channel, and/or a format for recording the program.

In another example, a command request may cause routing device 110 to forward command instructions to multiple premises devices 130 in connection with executing a function. For example, user device 190 may request recording an image at customer premises 101. Application server 170 may determine a customer premises 101 associated with the user (e.g., the user's home), and application server 170 may forward information to a routing device 110 associated with the customer premises 101 to request recording of the image. Routing device 110 may identify that the imaging recording may be performed in the associated customer premises 101 by an imaging device such as a security camera, and routing device 110 may forward instructions to the imaging device to cause the image to be captured.

Routing device 110 may further identify other commands to be implemented in connection with capturing the image by the imaging device, such as to cause a light controller to turn on a light while the image is being captured by the imaging device. For example, command data 122 may identify a second, additional command to be implemented in connection with a first command. Routing device 110 further determine, based on command data 122, an order for sending the command instructions, such as forwarding the instruction to the light controller to cause the light to be turned on before sending the instruction to cause the imaging device to capture the image.

While a series of blocks has been described with respect to FIGS. 6 and 7, the order of the blocks in processes 600 and 700 may be modified in other implementations. Further, non-dependent blocks may be performed in parallel. Furthermore, processes 600 and 700 may include additional and/or fewer blocks than those shown in FIGS. 600 and 700.

Also, various preferred embodiments have been described herein with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than a restrictive sense. For example, in another implementation, storage device 120 may be located remotely from customer premises 101 (e.g., at application server 170), and data connection 115 may enable routing device 110 to access command data 122 stored by the remote storage device 120. For example, data connection 115 may enable access to storage device 120 via a service network 160.

It will be apparent that different aspects of the description provided above may be implemented in many different forms of software, firmware, and hardware in the implementations illustrated in the figures. The actual software code or specialized control hardware used to implement these aspects is not limiting of the implementations. Thus, the operation and behavior of these aspects were described without reference to the specific software code—it being understood that software and control hardware can be designed to implement these aspects based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the implementations includes each dependent claim in combination with every other claim in the claim set.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

No element, act, or instruction used in the present application should be construed as critical or essential unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
   receiving, by a routing device, communications data from a plurality of devices connected to a local area network (LAN);
   parsing, by the routing device, the communications data to determine a plurality of functions performed by the plurality of devices;
   determining, by the routing device, command data based on the plurality of functions and associating a plurality of commands to the plurality of devices;
   receiving, by the routing device, a request for execution of a particular command of the plurality of commands;
   identifying, by the routing device and based on the command data, a particular device, of the plurality of devices, to execute the particular command;
   generating, by the routing device, an instruction message, wherein generating the instruction message includes:
      identifying a command parameter associated with execution of the particular command by the particular device, wherein the command parameter identifies data used by the particular device when executing the particular command, and
      modifying the request to include the command parameter, wherein the instruction message corresponds to the modified request;
   forwarding, by the routing device, the instruction message to the particular device via the LAN to cause the particular device to execute the particular command;
   determining, by the routing device, whether the particular device fails to execute the particular command based on the forwarded instruction message;
   retransmitting, by the routing device, the instruction message to the particular device via the LAN based on a determination that the particular device fails to execute the particular command in response to the forwarded instruction message;
   determining, by the routing device, whether the particular device fails to execute the particular command based on the retransmitted instruction message;
   identifying, by the routing device and based on the command data, another device, of the plurality of devices, to execute the particular command; and
   transmitting, by the routing device, the instruction message to the identified device via the LAN based on a determination that the particular device fails to execute the particular command in response to the retransmitted instruction message.

2. The method of claim 1, wherein the request includes a first address for the routing device, and wherein modifying the request further includes:
   replacing, in the request, the first address with a second address associated with the particular device.

3. The method of claim 2, wherein the LAN includes a wireless LAN (WLAN), and wherein the second address includes a WLAN address for the particular device.

4. The method of claim 1, further comprising:
   forwarding to an application server, a registration message that includes data identifying the plurality of commands, wherein the application server forwards, to a user device, command routing data identifying the plurality of commands and the routing device, and wherein the user device initiates the request.

5. The method of claim 1, wherein the request is initiated by a user device, and wherein the method further includes:
   validating the user device to determine that the user device is authorized to initiate the request to the particular device.

6. The method of claim 1, wherein the routing device includes a wide area network (WAN) input/output (I/O) port to receive the request and a LAN I/O port to forward the instruction message, and wherein forwarding the instruction message further includes:
   determining a path through a switch fabric connecting the WAN I/O port and the LAN I/O port, and
   forwarding a data unit related to the instruction message via the path.

7. An apparatus comprising:
   a memory configured to store instructions; and
   a processor configured to execute one or more of the instructions to:
      receive communications data from a plurality of devices connected to a local area network (LAN),
      parse the communications data to determine a plurality of functions performed by the plurality of devices,
      determine command data based on the plurality of functions and associating a plurality of commands with the plurality of devices,
      receive a request for execution of a particular command of the plurality of commands,
      identify a particular device, of the plurality of devices, to execute the particular command based on the command data,
   generate an instruction message, wherein the processor, when generating the instruction message, is further configured to:
      identify a command parameter associated with execution of the particular command by the particular device, wherein the command parameter identifies data used by the particular device when executing the particular command, and
      modify the request to include the command parameter, wherein the instruction message corresponds to the modified request,
   forward the instruction message to the particular device via the LAN to cause the particular device to execute the particular command,
   determine whether the particular device fails to execute the particular command based on the forwarded instruction message,
   retransmit the instruction message to the particular device via the LAN based on a determination that the particular device fails to execute the particular command in response to the forwarded instruction message,
   determine whether the particular device fails to execute the particular command based on the retransmitted instruction message,
   identify, based on the command data, another device, of the plurality of devices, to execute the particular command, and
   transmit the instruction message to the identified device via the LAN based on a determination that the particular device fails to execute the particular command in response to the retransmitted instruction message.

8. The apparatus of claim 7, wherein the request includes a first address for the apparatus, and wherein the processor, when modifying the request, is further configured to execute one or more of the instructions to:
replace, in the request, the first address with a second address associated with the particular device.

9. The apparatus of claim 7, wherein the processor, when determining the command data, is further configured to execute one or more of the instructions to:
receive messages from the plurality of devices, wherein the messages identify commands handled by the plurality of devices, and
populate the command data based on the messages.

10. The apparatus of claim 7, wherein the apparatus further comprises:
an input port configured to receive the request;
an output port configured to forward the instruction message to the particular device via the LAN; and
a switch fabric, and
wherein the processor, when forwarding the instruction message to the particular device via the LAN, is further configured to execute one or more of the instructions to:
configure the switch fabric to provide a path between the input port and the output port to carry the instruction message.

11. The apparatus of claim 7, wherein the processor is further configured to execute one or more of the instructions to:
forward, to an application server, a registration message that includes data identifying the plurality of commands, wherein the application server forwards, to a user device, command routing data identifying the plurality of commands and the apparatus, and wherein the user device initiates the request.

12. The apparatus of claim 7, wherein the command parameter further identifies a time when the particular device is to execute the particular command.

13. A non-transitory computer-readable medium to store instructions, the instructions including:
one or more instructions that, when executed by a processor associated with a routing device, cause the processor to:
receive communications data from a plurality of devices connected to a local area network (LAN),
parse the communications data to determine a plurality of functions performed by the plurality of devices,
determine command data based on the plurality of functions and associating a plurality of commands with the plurality of devices,
receive a request for execution of a particular command of the plurality of commands,
identify a particular device, of the plurality of devices, to execute the particular command based on the command data,
generate an instruction message to execute the particular command, wherein the one or more instructions further cause the processor, when generating the instruction message, to:
identify a command parameter associated with execution of the particular command by the particular device, wherein the command parameter identifies data used by the particular device when executing the particular command, and
modify the request to include the command parameter, wherein the instruction message corresponds to the modified request,
forward the instruction message to the particular device via the LAN to cause the particular device to execute the particular command,
determine whether the particular device fails to execute the particular command based on the forwarded instruction message,
retransmit the instruction message to the particular device via the LAN based on a determination that the particular device fails to execute the particular command in response to the forwarded instruction message,
determine whether the particular device fails to execute the particular command based on the retransmitted instruction message,
identify, based on the command data, another device, of the plurality of devices, to execute the particular command, and
transmit the instruction message to the identified device via the LAN based on a determination that the particular device fails to execute the particular command in response to the retransmitted instruction message.

14. The non-transitory computer-readable medium of claim 13, wherein the request includes a first address for the routing device, and wherein the one or more instructions cause the processor, when modifying the request, to further:
replace, in the request, the first address with a second address associated with the particular device.

15. The non-transitory computer-readable medium of claim 13, wherein the routing device includes:
an input port configured to receive the request,
an output port configured to forward the instruction message to the particular device via the LAN, and
a switch fabric, and
wherein the one or more instructions cause the processor, when forwarding the instruction message to the particular device via the LAN, to further:
establish, via the switch fabric, a path between the input port and the output port to carry the instruction message.

16. The non-transitory computer-readable medium of claim 13, wherein the particular command is a first command, the particular device is a first device, and the instruction message is a first instruction message; and
wherein the one or more instructions further cause the processor to:
determine a second command associated with execution of the first command,
identify a second device, of the plurality of devices, to execute the second command,
generate a second instruction message to execute the second command, and
forward the second instruction message to the second device via the LAN, wherein
the second instruction message causes the second device to execute the second command.

17. The non-transitory computer-readable medium of claim 16, wherein the one or more instructions further cause the processor to:
identify an order for performing the first command and the second command, wherein the first instruction message and the second instruction message are sent to the first device and the second device based on the order.

18. The method of claim 1, wherein identifying the command parameter further includes:
   identifying another command to be performed by the particular device in connection with performing the particular command, wherein the command parameter further identifies the other command, and wherein the instruction message further causes the particular device to execute the other command.

19. The method of claim 1, wherein the command parameter further identifies a device, and wherein instruction message further causes the particular device to forward, to the device, a result generated when executing the particular command.

\* \* \* \* \*